UNITED STATES PATENT OFFICE.

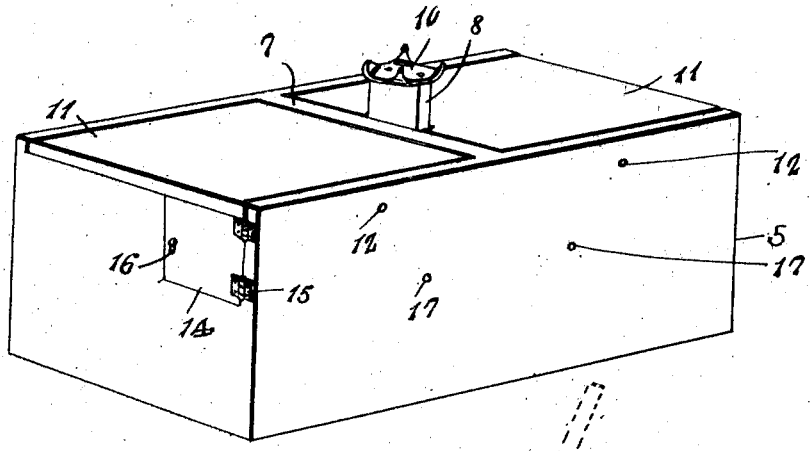
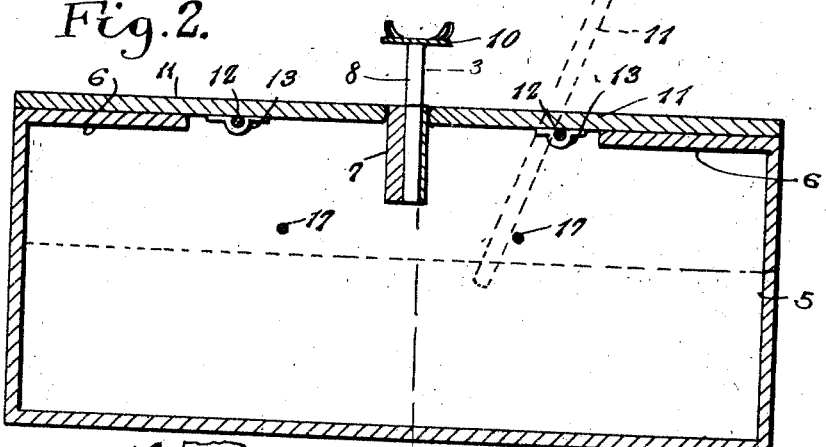

WILLIAM L. WIGINGTON, OF FLOYDADA, TEXAS.

TRAP.

1,366,989.   Specification of Letters Patent.   Patented Feb. 1, 1921.

Application filed May 10, 1918. Serial No. 233,725.

*To all whom it may concern:*

Be it known that I, WILLIAM L. WIGINGTON, a citizen of the United States, residing at Floydada, in the county of Floyd and State of Texas, have invented certain new and useful Improvements in Traps; and I do hereby declare the following to be a full, clear, and exact description of the invention, such as will enable others skilled in the art to which it appertains to make and use the same.

My invention relates to improvements in animal traps and has special reference to animal traps of the dead fall type.

An important object of my invention is to provide an animal trap of the character described, especially adapted for trapping rats, mice, minks and other small animals.

A further object of the invention is to provide an animal trap of the character described, having a pair of pivoted doors arranged on opposite sides of a baiting standard, said baiting standard to be adjustable vertically.

A further object of the invention is to provide an animal trap of the character described which is adapted to be partly filled with water for the purpose of drowning the animal upon becoming entrapped in the device.

A further object of the invention is to provide a trap of the ever ready-ever set type which is neat in appearance, of highly simplified construction and cheap to manufacture.

Other objects and advantages of the invention will be apparent in the course of the following description.

In the accompanying drawings forming a part of this specification and in which like numerals are employed to designate like parts throughout the same, Figure 1 is a perspective of my improved trap, Fig. 2 is a vertical longitudinal central section taken through my improved trap, and, Fig. 3 is a section taken on line 3—3 of Fig. 2.

In the drawings, wherein for the purpose of illustration is shown the preferred embodiment of my invention, the numeral 5 designates a metallic rectangular casing which may be of any desired size. Extending transversely of the upper portion of the casing 5 are crossed members 6. Arranged centrally of the end portions of the casing 5 and extending transversely of the sides of the casing is a cross head 7 extending downwardly into the casing for a substantial distance and carrying a vertically adjustable standard 8. Plates 9 extending over the edges of the vertically adjustable standard 8 are adapted to engage the standards sufficiently tight to retain the same in a set position. The upper portion of the standard 8 carries a bait receiving member 10. It is thus apparent that the bait receiving member 10 may be adjusted at any desired height with respect to the top of the casing 5.

Doors 11 arranged on opposite sides of the cross head 7 carry pins 12 extending transversely of the door 11 and through the sides of the casing 5. The transverse pins 12 are secured to the door 11 by hinged plates 13 spaced inwardly of the center of the door 11, thus having the heavier portion of each door 11 outwardly of the pivots 12 to cause the same to normally retain its closed position.

To permit of the convenient extraction of the animals from the trap, a door 14 is provided at one end of the casing 5 and is hinged thereto as at 15. A latch 16 serves to hold the door closed.

Cross pins 17, secured to the casing 15, serve to restrict the downward movement of the door 11.

The operation of my improved trap is as follows:

The bait for the trap is placed in the bait receiving member 10 and the said bait is adjusted to any desired height. It will be seen that an animal upon attempting to reach the bait will come on the dead portion of the door 11 and fall into the casing which is partly filled with water, as indicated by the dotted lines in Fig. 2. It will be seen that an exit from the trap will be prevented near the ends thereof by the overhanging members 6.

While I have shown and described the preferred embodiment of my invention, it is understood that I may make such minor changes in arrangement and construction of parts, as will remain within the spirit of the invention and the appended claim.

Having thus described my invention, what I claim is:

A trap comprising a casing consisting of a bottom, side and end walls and cross members extending from the end wall along the upper edges of the side walls and spaced from each other at their inner edges, a cross head located approximately midway between the inner edges of the cross members and secured to the side walls at the upper portions thereof, the lower portion of the cross head extending into the casing below the lower surfaces of the cross members, doors pivoted to the side walls of the casing at points between the inner edges of the cross members and the side of the cross head, the doors being positioned upon their pivots whereby they normally lie parallel with the cross members and in contact with the same and with their inner edges adjacent the sides of the cross head, spaced guides carried at one side of the cross head, a vertical standard adjustably carried by the guide and a bait holder mounted upon the standard.

In testimony whereof I affix my signature in presence of two witnesses.

WILLIAM L. WIGINGTON.

Witnesses:
ARTHUR B. DUNCAN,
M. RUTH PITTS.